US009691356B2

(12) United States Patent
Biggs et al.

(10) Patent No.: US 9,691,356 B2
(45) Date of Patent: Jun. 27, 2017

(54) DISPLAYING PORTIONS OF A VIDEO IMAGE AT A DISPLAY MATRIX

(75) Inventors: Kent E. Biggs, Tomball, TX (US); David M. Nypaver, Porter, TX (US); Timothy G. Solomon, Tomball, TX (US); Michael A. Provencher, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 413 days.

(21) Appl. No.: 14/354,046

(22) PCT Filed: Dec. 2, 2011

(86) PCT No.: PCT/US2011/062985
§ 371 (c)(1),
(2), (4) Date: Apr. 24, 2014

(87) PCT Pub. No.: WO2013/081624
PCT Pub. Date: Jun. 6, 2013

(65) Prior Publication Data
US 2014/0293132 A1 Oct. 2, 2014

(51) Int. Cl.
*H04N 5/44* (2011.01)
*G09G 5/12* (2006.01)
(Continued)

(52) U.S. Cl.
CPC ........... *G09G 5/12* (2013.01); *H04L 12/1827* (2013.01); *H04L 65/604* (2013.01); *H04N 5/44* (2013.01)

(58) Field of Classification Search
USPC ......... 348/571, 552, 553, 725; 345/592, 1.3, 345/628, 667
See application file for complete search history.

(56) References Cited

U.S. PATENT DOCUMENTS 6,985,245 B1 * 1/2006 Takahashi .................... 358/1.15
7,477,326 B2 * 1/2009 Jaffe ............................ 348/726
(Continued)

FOREIGN PATENT DOCUMENTS

JP 2008-164986 A 7/2008

OTHER PUBLICATIONS

International Search Report and Written Opinion, International Application No. PCT/US2011/082985, Date of Mailing: Aug. 27, 2012, pp. 1-7.
(Continued)

*Primary Examiner* — Paulos M Natnael
(74) *Attorney, Agent, or Firm* — Brooks, Cameron & Heubsch

(57) ABSTRACT

Systems, methods, and computer-readable and executable instructions are provided for providing a video clone to a display matrix. Providing a video clone to a display matrix can include utilizing a computing device to transfer video images via Ethernet to a network interface controller (NIC) device 602. Providing a video clone to a display matrix also can include utilizing the NIC device to transfer the video images to a plurality of displays 604. Providing a video clone to a display matrix also can include determining a plurality of portions of the video images that correspond to the plurality of displays utilizing a display scalar 606. Furthermore, providing a video clone to a display matrix can include associating the display scalar with each of the plurality of displays of the display matrix to display the video clone of each of the portions of video images 608.

14 Claims, 7 Drawing Sheets

(51) Int. Cl.
*H04L 12/18* (2006.01)
*H04L 29/06* (2006.01)

(56) References Cited

U.S. PATENT DOCUMENTS

| | | | |
|---|---|---|---|
| 7,525,600 B2* | 4/2009 | Kaylani et al. | 348/554 |
| 7,992,177 B2 | 8/2011 | Perry et al. | |
| 8,410,993 B2* | 4/2013 | Jenks et al. | 345/1.3 |
| 8,497,883 B2* | 7/2013 | Ito | 345/667 |
| 2003/0098820 A1* | 5/2003 | Someya et al. | 345/1.3 |
| 2006/0059513 A1 | 3/2006 | Tang et al. | |
| 2006/0209858 A1* | 9/2006 | Blum | 370/402 |
| 2006/0282855 A1 | 12/2006 | Margulis | |
| 2007/0046986 A1* | 3/2007 | Ooba | 358/1.15 |
| 2007/0211167 A1* | 9/2007 | Adams et al. | 348/452 |
| 2008/0174693 A1* | 7/2008 | Hao et al. | 348/445 |
| 2009/0207269 A1* | 8/2009 | Yoda | 348/222.1 |
| 2010/0123732 A1* | 5/2010 | Jenks et al. | 345/592 |
| 2010/0174783 A1 | 7/2010 | Zarom | |
| 2010/0183000 A1 | 7/2010 | Nakayama et al. | |
| 2011/0122877 A1 | 5/2011 | Gelke et al. | |
| 2011/0219249 A1* | 9/2011 | Kuwahara | 713/323 |
| 2012/0001831 A1* | 1/2012 | Smith et al. | 345/1.3 |
| 2013/0293737 A1* | 11/2013 | Yim et al. | 348/222.1 |

OTHER PUBLICATIONS

IP Video Security Guide, 2011, pp. 1-42, Pelco, Inc., Available at: <pelco.com/documents/product/en/shared/ip/ip-videosecurity-guide.pdf>.

Robert E. Brydia et al., "Video Over IP Design Guidebook," Project: 0-5942, Product: 0-5942-P1, Dec. 2009, pp. 1-168, Available at: <tti.tamu.edu/documents/0-5942-P1.pdf>.

* cited by examiner

DISPLAYING PORTIONS OF A VIDEO IMAGE AT A DISPLAY MATRIX

CROSS-REFERENCE TO RELATED APPLICATION

This application is a national stage application under 35 U.S.C. §371 of PCT/US2011/062985, filed 2 Dec. 2011.

BACKGROUND

Matrix displays can allow an image to be displayed on a large scale by utilizing multiple displays instead of using a single large display. Matrix displays can be utilized to project a single image across the multiple displays or multiple images across the multiple displays to give an appearance of a single image. Display matrixes can be utilized in a variety of situations that require a large display for presenting information.

DETAILED DESCRIPTION

Figure 1:
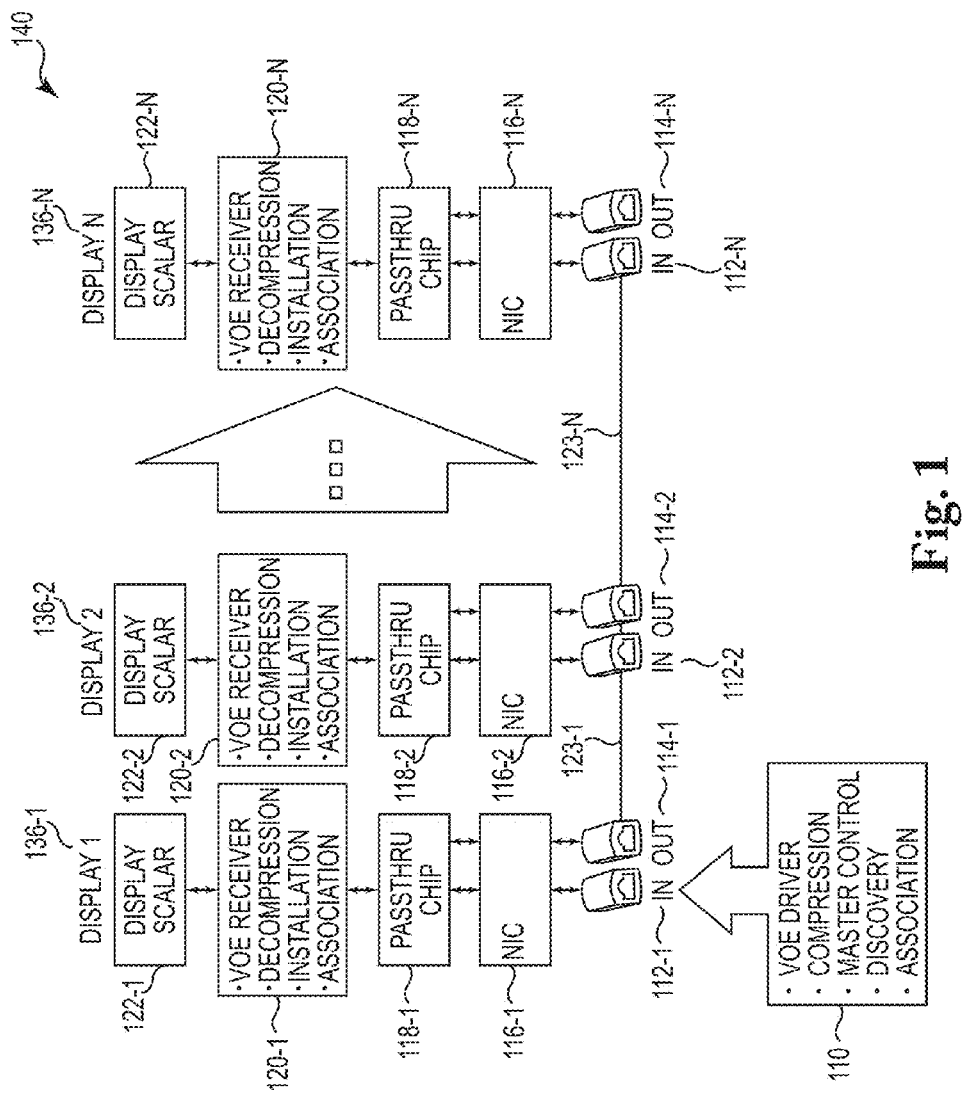
FIG. 1 illustrates an example diagram representing a system for providing a video clone to a display matrix via Ethernet daisy chain, according to the present disclosure.

Examples of the present disclosure include methods, systems, and computer-readable executable instructions and/or logic. Methods for providing a video clone to a display matrix include utilizing a computing device to transfer video images via Ethernet to a network interface controller (NIC) device. Providing a video clone to a display matrix also can include utilizing the NIC device to transfer the video images to a plurality of displays. Providing a video clone to a display matrix also can include determining a plurality of portions of the video images that correspond to the plurality of displays utilizing a display scalar. Furthermore, providing a video clone to a display matrix can include associating the display scalar with each of the plurality of displays of the display matrix to display the video clone of each of the portions of video images.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. The present embodiment is not restricted by a number of devices and thus N can represent any positive integer representing the number of devices utilized in a specific application of the present embodiment.

FIG. 1 illustrates an example diagram representing a system 140 for providing a video clone to a display matrix via Ethernet daisy chain, according to the present disclosure. System 140 can include a computing device 110 that can comprise a VoE driver, a master control, a discovery mechanism, a display scalar, and/or a compression driver. The VoE driver can allow the computing device to transfer video images over Ethernet. The master control can be a technical hub for broadcasting the video images. The discovery mechanism can discover or locate NIC devices (e.g. network interface card, network adapter, local area network (LAN) adapter) that are within a network. The display scalar can create portions of video images based on the orientation of the display matrix. The video image portions can then be transferred to a NIC device connected to a plurality of displays based on the orientation of the display matrix. The compression driver can compress the video images before transferring them via Ethernet in order to conserve bandwidth over the network.

The computing device 110 can transfer the video images via Ethernet to an IN port 112-1 of a first NIC device 116-1. The computing device 110 can also transfer the video images via Ethernet after creating a video clone. Video clone as described herein can comprise creating a number of multiple copies of video images. The first NIC device 116-1 transfers the video images to a first VoE receiver 120-1 through a first passthru chip 118-1. A passthru chip can comprise a device to connect the NIC device to the VoE receiver. For example, a passthru chip can be a frame buffer. The first NIC device 116-1 can transfer the video images from an OUT port 114-1 via an Ethernet cable 123-1 to an IN port of a second NIC device 116-2. The second NIC device can follow the procedure of the first NIC device and transfer the video images to a second VoE receiver 120-2 through a second passthru chip 118-2. The second NIC device can transfer the video images from the OUT port 114-2 via Ethernet cable 123-N to an IN port 112-N of an N'th NIC device 116-N. The N'th NIC device can follow the procedure of the first and the second NIC devices and can transfer the video images to an N'th VoE receiver 120-N through an N'th passthru chip 118-N. The N'th NIC device can, for example, transfer the video images from the OUT port 114-N to another device IN port.

The VoE receiver 120-1, 120-2, . . . , 120-N can comprise a decompressing driver, an installation driver, and/or an association driver. The decompressing driver can decompress the video images received via Ethernet from the computing device 110. The installation driver can install software that may be needed for the compliance with display devices 136-1, 136-2, . . . , 136-N, the NIC devices 116-1, 116-2, . . . , 116-N, and/or the computing device 110. The association driver can create a connection with the NIC device 116-1, 116-2, . . . , 116-N.

The display scalar 122-1, 122-2, . . . , 122-N can determine a portion of the image to display based on the orientation of the display matrix. For example, if the display scalar 122-1 represents lower right portion of the video image, then the display scalar 122-1 can determine the portion of the video image to display in order to create the desired display matrix. A desired display matrix can include a set of displays 136-1, 136-2, . . . , 136-3 put in an orientation to act as a single display.

In some embodiments the computing device 110, NIC devices 116-1, 116-2, . . . , 116-N, and the displays 136-1, 136-2, . . . , 136-3 are part of an intranet controlled by a single party.

The benefits of system 140 include, but are not limited to, utilizing a relatively simple set-up of a Ethernet daisy chain compared to a wireless set-up, utilizing one video stream on the network, utilizing a display scalar configured to receive and create portions in a VoE configuration, and utilizing less expensive network cables compared to other video cables (Display Port (DP), VGA, Component Video).

Figure 2:
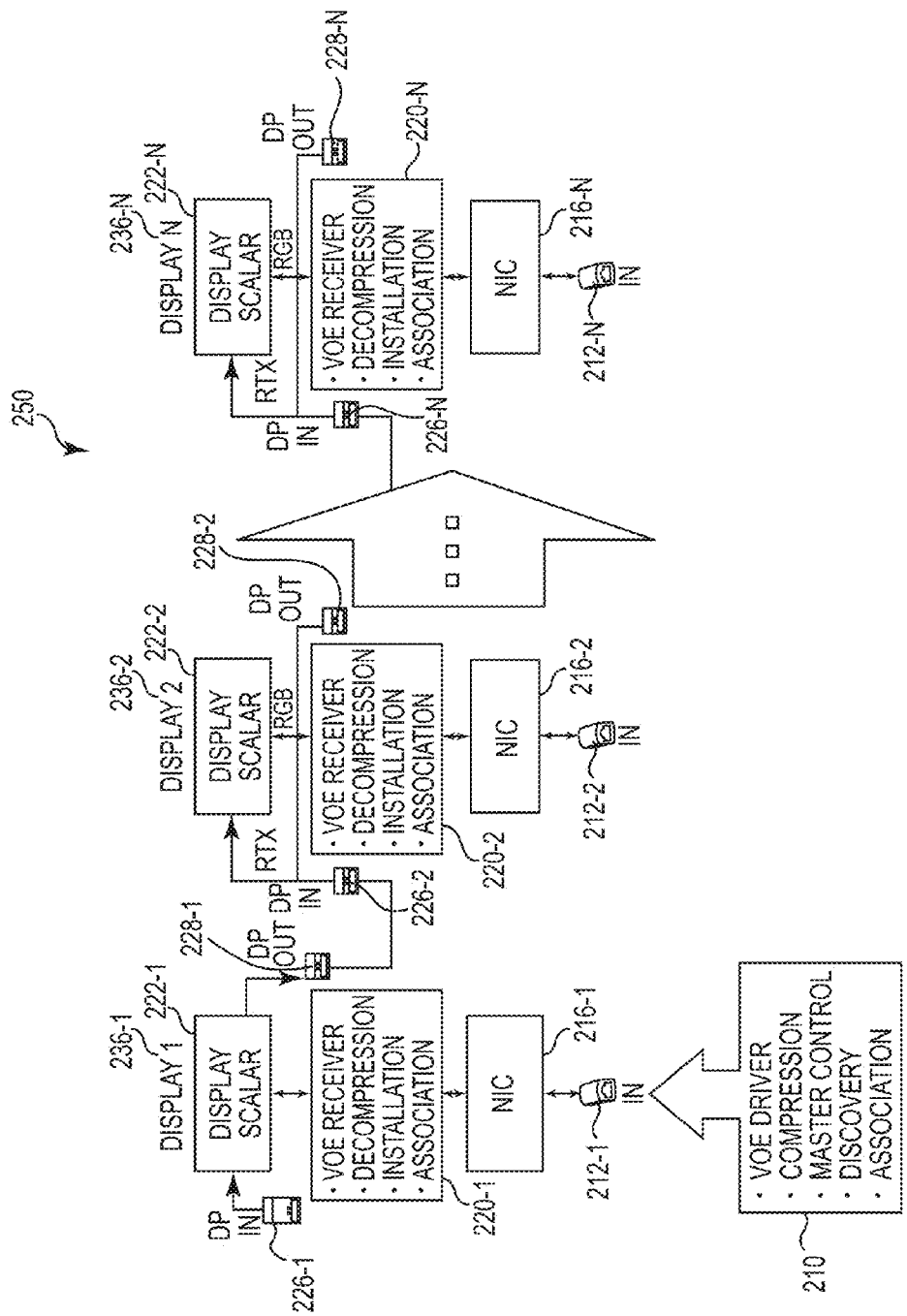
FIG. 2 illustrates an example diagram representing a system for providing a video clone to a display matrix via Ethernet, according to the present disclosure.

FIG. 2 illustrates an example diagram representing a system 250 for providing a video clone to a display matrix via Ethernet, according to the present disclosure. System 250 can include a computing device 210. The computing device 210 can comprise a VoE driver, a master control, a discovery mechanism, a display scalar, and/or a compression driver as described herein. The computing device 210 can transfer video images via Ethernet to an IN port 312-1 of a NIC device 216-1. The NIC device 216-1 can transfer the video images to a VoE receiver 220-1. The VoE receiver 220-1 can transfer the video images to the first display scalar 222-1. The computing device can transfer the video images via Ethernet to an IN port 212-2, . . . , 212-N of a NIC device 216-2, . . . , 216-N respectively. The NIC device 216-2, . . . , 216-N can transfer the video images to a VoE receiver 220-2, . . . , 220-N respectively and follow the procedure described for IN port 212-1, NIC device 216-1, and VoE receiver 220-1. The first display scalar 222-1 can convert the VoE signal from the VoE receiver 220-1 to an RGB signal utilizing a translate function (e.g. xlat). The display scalar 222-1 can transfer the RGB signal via video cables (e.g. Display Port (DP), VGA, Component Video). The display scalar can utilize a first DP OUT port 228-1 to transfer the video images to a first DP IN port 226-2 connected to a second display scalar 222-2. The first DP IN port 226-2 can also transfer the video images to a second DP OUT port 228-2. The second DP OUT port 228-2 can transfer the video images to an N'th DP IN port 326-N. The N'th DP IN port 226-N can transfer the video images to an N'th display scalar 222-N and to an N'th DP OUT port 226-N.

The display scalar 222-1, 222-2, . . . , 222-N can determine a portion of the image to display based on the orientation of the display matrix as described herein.

In some embodiments the computing device 210, NIC devices 216-1, 216-2, . . . , 216-N, and the displays 236-1, 236-2, . . . , 236-3 are part of an intranet controlled by a single party.

The benefits of system 250 include, but are not limited to utilizing a display daisy chain, utilizing one video stream on the network, utilizing a display scalar configured to receive and create portions in a VoE configuration, and utilizing a single NIC port for the matrix.

Figure 3:
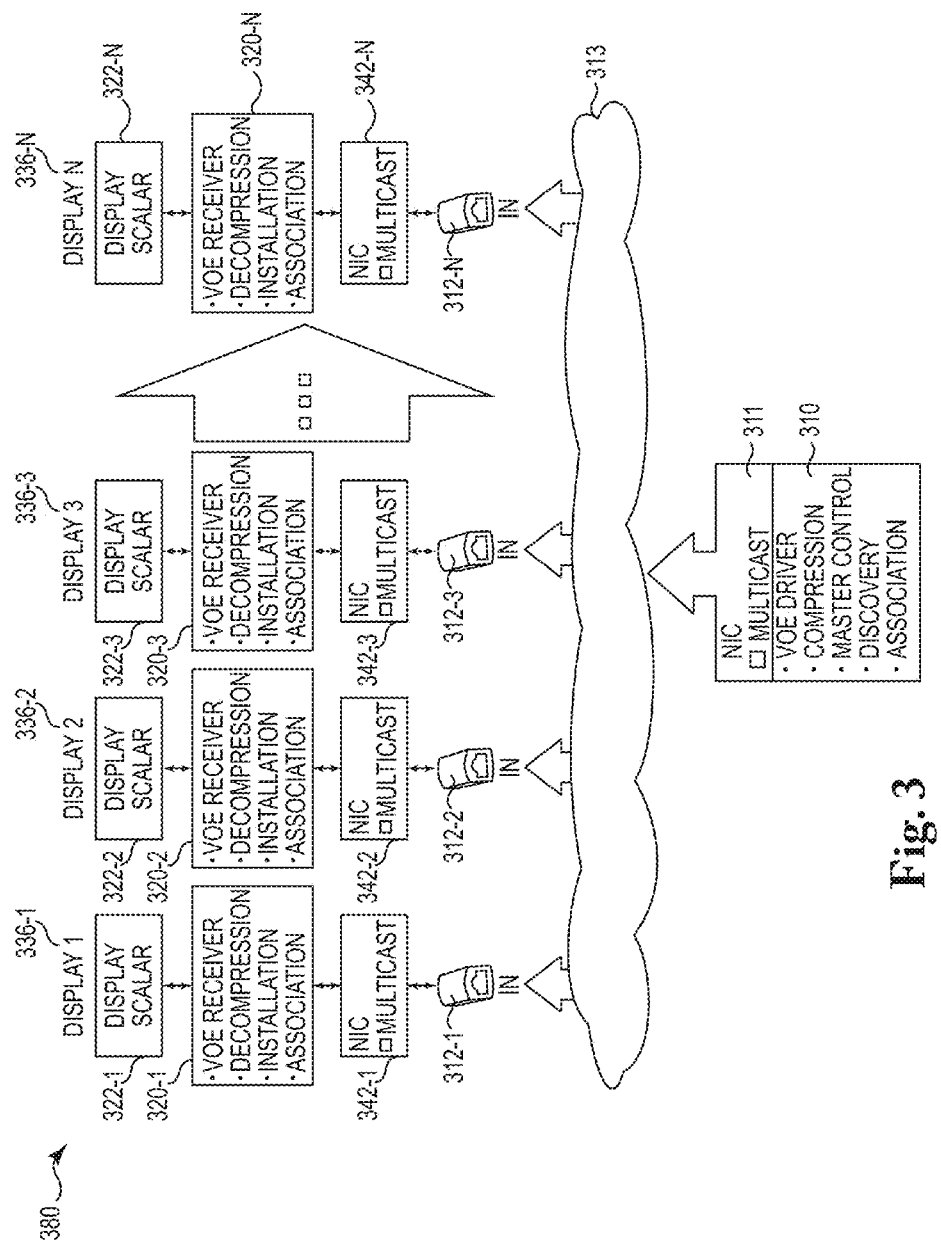
FIG. 3 illustrates an example diagram representing a system for providing a video clone to a display matrix via multicast, according to the present disclosure.

FIG. 3 illustrates an example diagram representing a system 380 for providing a video clone to a display matrix via multicast, according to the present disclosure. System 380 can include a computing device 310. The computing device 310 can comprise a VoE driver, a master control, a discovery mechanism, a display scalar, and/or a compression driver as described herein. System 380 can include a NIC Multicast device 311 to produce a multicast of the video images. A multicast can refer to a delivery of messages (e.g. video images, information) to a group of destination devices simultaneously in a single transmission or multiple transmissions from a source. A multicast can also refer to a delivery of messages to all recipients simultaneously within a network (e.g. broadcasting). A multicast can also refer to a delivery of messages to a single recipient within a network (e.g. unicast). The NIC Multicast device 311 can send video images via multicast over a network 313 to the NIC devices 342-1, 342-2, 342-3, . . . , 342-N that can receive video images simultaneously through IN ports 312-1, 312-2, 312-3, . . . , 312-N, respectively. The NIC devices 342-1, 342-2, 342-3, . . . , 342-N can transfer the video images to the VoE receivers 320-1, 320-2, 320-3, . . . , 320-N, respectively.

The VoE receivers 320-1, 320-2, 320-3, . . . , 320-N can comprise a decompressing driver, an installation driver, and/or an association driver as described herein. The VoE receivers 320-1, 320-2, 320-3, . . . , 320-N can transfer the video images to display scalars 322-1, 322-2, 322-3, . . . , 322-N.

The display scalars 322-1, 322-2, 322-3, . . . , 322-N can determine a portion of the video images to display based on the orientation of the display matrix as described herein.

In some embodiments the computing device 310, NIC devices 316-1, 316-2, . . . , 316-N, and the displays 336-1, 336-2, . . . , 336-3 are part of an intranet controlled by a single party.

The benefits of system 380 include, but are not limited to, utilizing one video stream on the network, utilizing less expensive network cables compared to other video cables (Display Port (DP), VGA, Component Video), utilizing a display scalar configured to receive and create portions in a VoE configuration, and using a single NIC port to transfer the video images.

Figure 4:
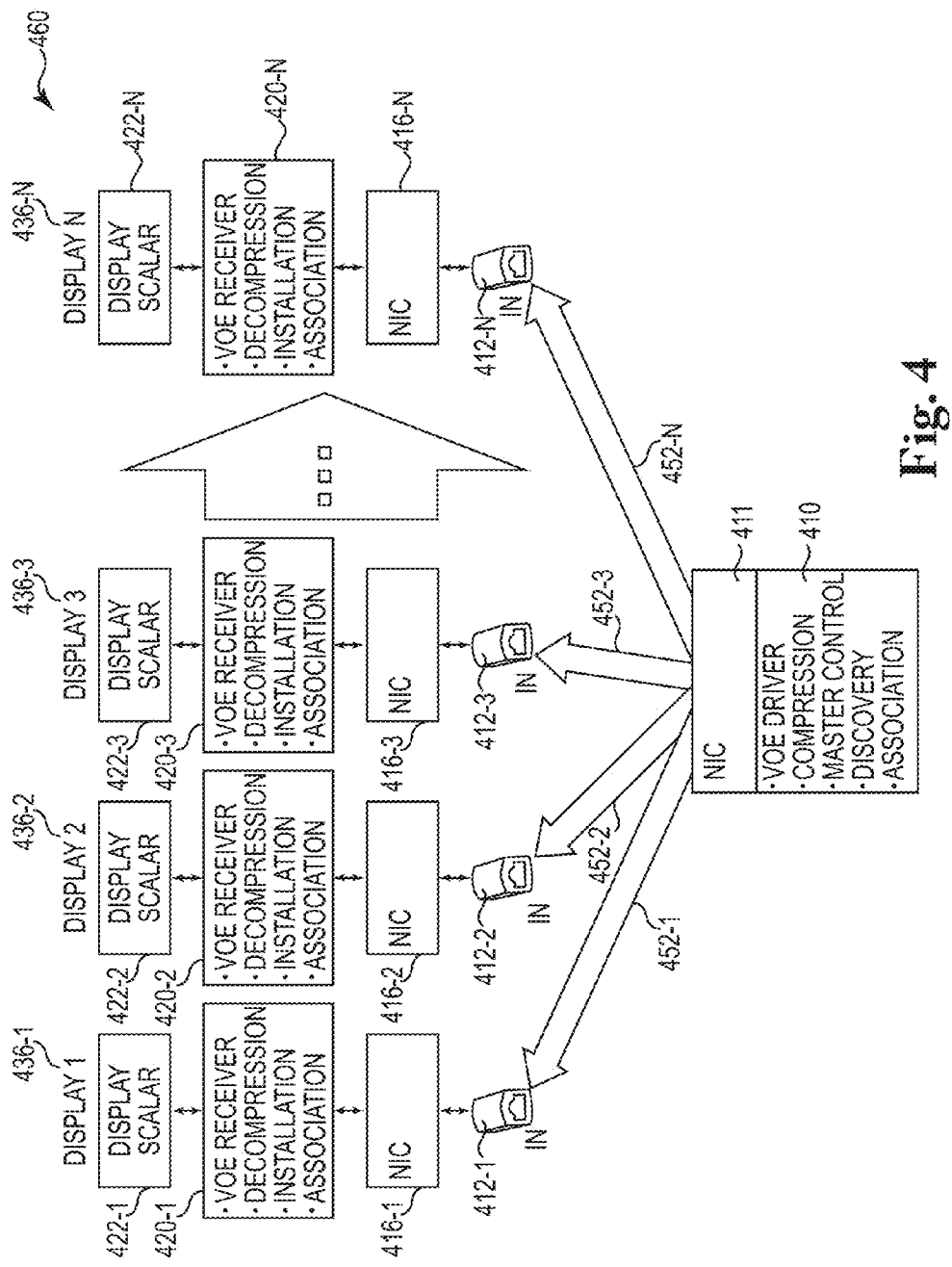
FIG. 4 illustrates an example diagram representing a system for individually providing a video clone to a plurality of displays in a display matrix via Ethernet, according to the present disclosure.

FIG. 4 illustrates an example diagram representing a system 460 for individually providing a video clone to a plurality of displays in a display matrix via Ethernet, according to the present disclosure. System 460 can include a computing device 410. The computing device 410 can comprise a VoE driver, a master control, a discovery mechanism, a display scalar, and/or a compression driver as described herein. Computing device 410 can comprise a NIC device 411. Computing device 410 can transfer video images via Ethernet cables 452-1, 452-2, 452-3, . . . , 452-N to an IN port 412-1, 412-2, 412-3, . . . , 412-N at a plurality of NIC devices 416-1, 416-2, 416-3, . . . , 416-N. The video images can be transferred via a video clone to the plurality of NIC devices 416-1, 416-2, 416-3, . . . , 416-N. The plurality of NIC devices 416-1, 416-2, 416-3, . . . , 416-N can transfer the video images to a VoE receiver 420-1, 420-2, 420-3, . . . , 420-N.

The VoE receiver 420-1, 420-2, 420-3, . . . , 420-N can comprise a decompressing driver, an installation driver, and/or an association driver as described herein. The VoE receiver 420-1, 420-2, 420-3, . . . , 520-N can transfer the video images to a display scalar 422-1, 422-2, 422-3, . . . , 422-N.

The display scalar 422-1, 422-2, 422-3, . . . , 422-N can determine a portion of the video images to display based on the orientation of the display matrix as described herein.

In some embodiments the computing device 410, NIC devices 416-1, 416-2, . . . , 416-N, and the displays 436-1, 436-2, . . . , 436-3 are part of an intranet controlled by a single party.

The benefits of system 460 include, but are not limited to, utilizing relatively quick set-up compared to a daisy chain set-up, utilizing less expensive network cables compared to other video cables (Display Port (DP), VGA, Component Video), utilizing a display scalar configured to receive and create portions in a VoE configuration, and using a single NIC port to transfer the video images.

Figure 5:
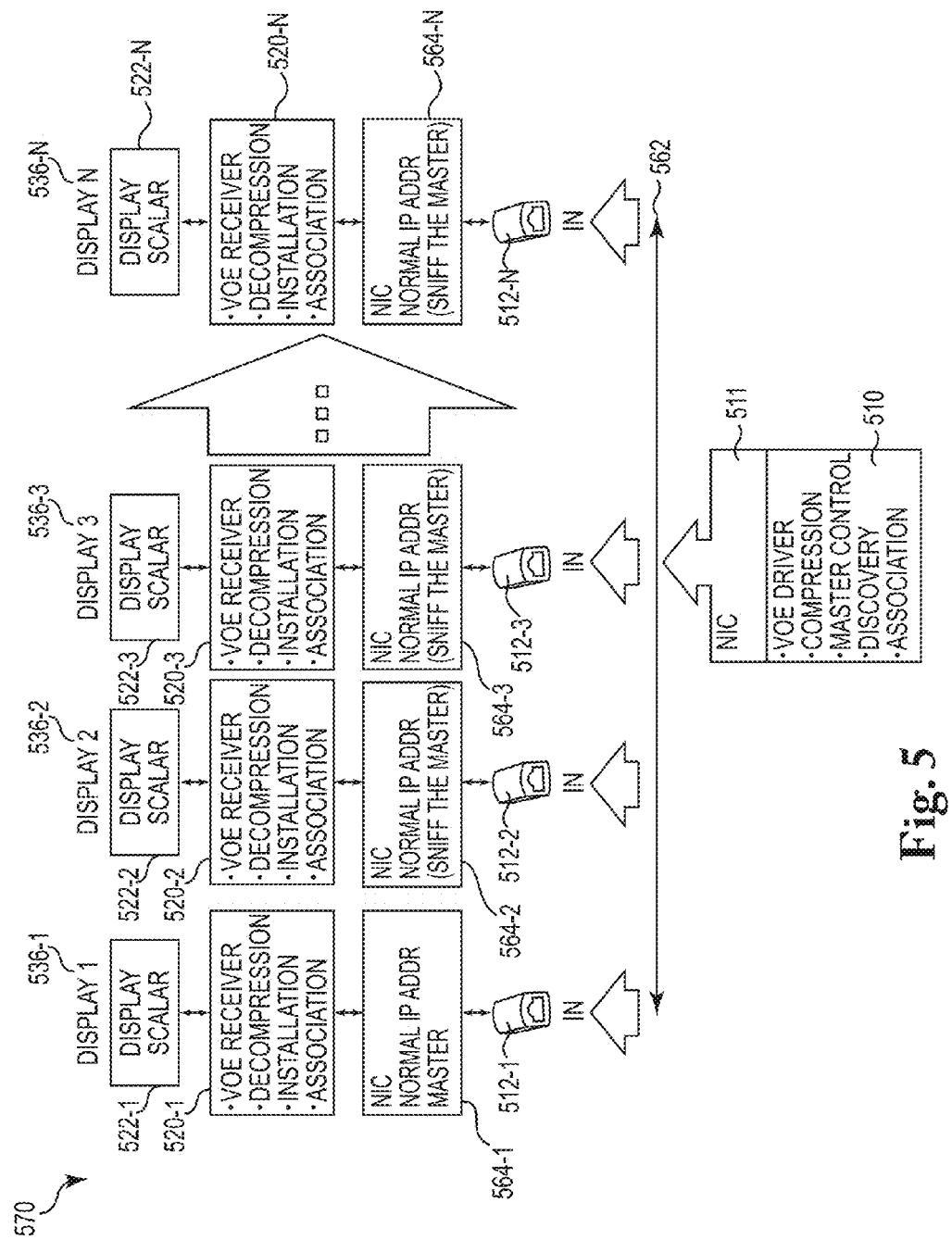
FIG. 5 illustrates an example diagram representing a system for providing a video clone to a display matrix via sniffcast, according to the present disclosure.

FIG. 5 illustrates an example diagram representing a system 570 for providing a video clone to a display matrix via sniffcast, according to the present disclosure. System 570 can include a computing device 510. The computing device 510 can comprise a VoE driver, a master control, a discovery mechanism, a display scalar, and/or a compression driver as described herein. In system 570 the computing device can also comprise a NIC device 511. Computing device 510 can transfer video images over a network 562 to an IN port 512-1 on a master NIC device 564-1. The master NIC device 564-1 can comprise a label assigned to the location (e.g. IP address) where the computing device 510 sends the video images via the network 562. The NIC devices 564-2, 564-3, . . . , 564-N can utilize a packet analyzer, network analyzer, protocol analyzer, and/or sniffer (e.g. CAPSA, DSNIFF, JUSTNIFFER, SNOOP) to retrieve the video images sent to the Master NIC device 564-1 via an IN port 512-2, 512-3, . . . , 512-N. The NIC device, 564-1, 564-2, 564-3, . . . , 564-N can transfer the video images to a VoE receiver 520-1, 520-2, 520-3, . . . , 520-N.

The VoE receiver 520-1, 520-2, 520-3, . . . , 520-N can comprise a decompressing driver, an installation driver, and/or an association driver as described herein. The VoE receiver 520-1, 520-2, 520-3, . . . , 620-N can transfer the video images to a display scalar 522-1, 522-2, 522-3, . . . , 522-N.

The display scalar 522-1, 522-2, 522-3, . . . , 522-N can determine a portion of the video images to display based on the orientation of the display matrix as described herein.

In some embodiments the computing device 510, NIC devices 516-1, 516-2, . . . , 516-N, and the displays 536-1, 536-2, . . . , 536-3 are part of an intranet controlled by a single party.

The benefits of system 570 include, but are not limited to, one video stream on the network as opposed to multiple video streams, less expensive network cables compared to other video cables (Display Port (DP), VGA, Component Video), utilizing a display scalar configured to receive and create portions in a VoE configuration, and using a single NIC port to transfer the video images.

Figure 6:
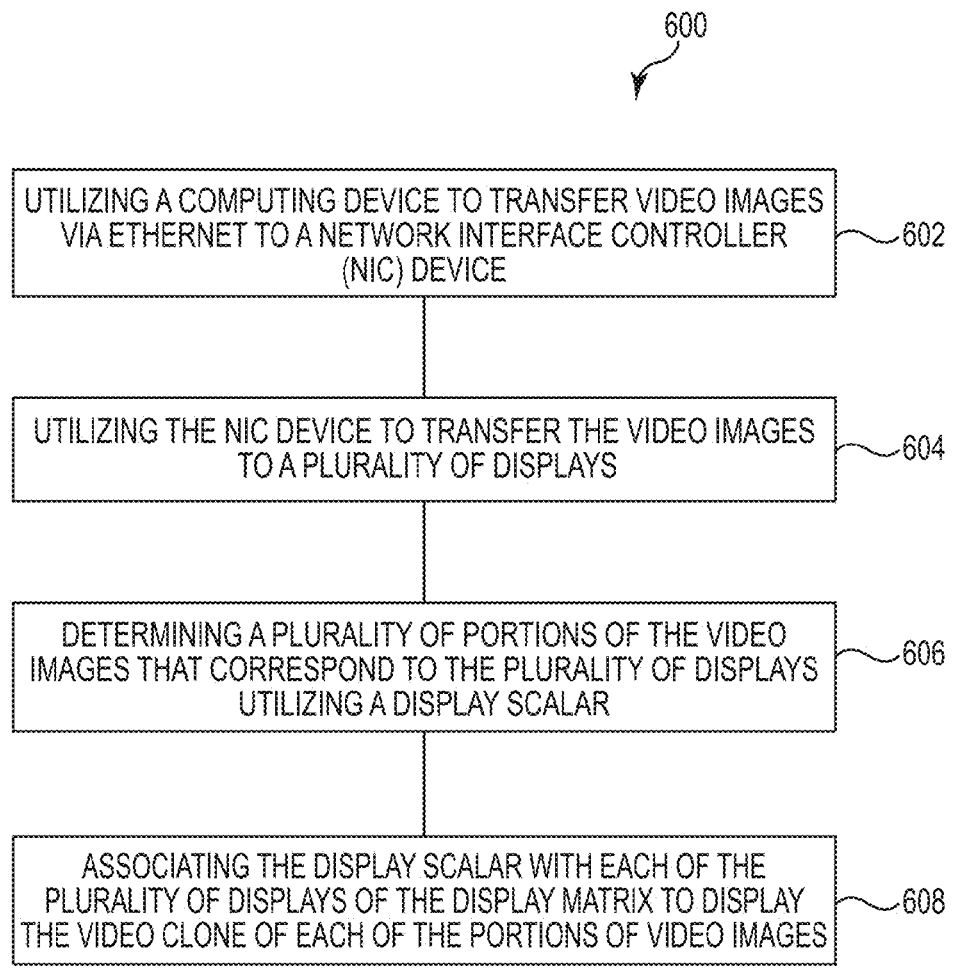
FIG. 6 is a flow chart illustrating an example method for providing a video clone to a display matrix, according to the present disclosure

FIG. 6 is a flow chart illustrating an example method 600 for providing a video clone to a display matrix, according to the present disclosure. Method 600 can provide a video clone to a display matrix via Ethernet. For example, a computing device can transfer Video Over Ethernet (VoE) to a network interface controller (NIC) device (e.g. network interface card, network adapter, local area network (LAN) adapter) that is connected to a plurality of displays. Video clone as described herein can comprise creating a number of multiple copies of video images. Reference will be made to the structural features of FIG. 1 that can perform method 600. As stated herein, similar elements or components between different figures may be identified by the use of similar digits. For example, 110 may reference element "10" in FIG. 1, and a similar element may be referenced as 210 in FIG. 2. Method 600 is not intended to be limited to the structural features of FIGS. 1-5.

At 602, the computing device 110 transfers video images via Ethernet to a network interface controller (NIC) device 116-1, 116-2, . . . , 116-N. The computing device 110 can utilize a VoE driver. A VoE driver can allow a computing device 110 to convert various formats of a video image to a format that can be transferred via Ethernet (e.g. Ethernet frame). The computing device 110 can also compress (e.g. zip file) the video images before transferring via Ethernet. The computing device 110 can further utilize other common features of computing devices including, but not limited to, master controls, discovery mechanisms for NIC, NIC device, display scalar, and/or association mechanisms.

NIC devices 116-1, 116-2, . . . , 116-N include devices that can connect a computing device 110 to a computing network (e.g. internet, LAN). The NIC device 116-1, 116-2, . . . , 116-N can contain an IN port 112-1, 112-2, . . . , 112-N to receive VoE signals. The NIC device 116-1, 116-2, . . . , 116-N can also contain an OUT port 114-1, 114-2, . . . , 114-N to transfer the VoE signals to a display device 136-1, 136-2, . . . , 136-N and/or to a different NIC device 116-1, 116-2, . . . , 116-N. The NIC device 116-1, 116-2, . . . , 116-N can be incorporated in the display device 136-1, 136-2, . . . , 136-N and/or the NIC device 116-1, 116-2, . . . , 116-N can be a separate device from the display device 136-1, 136-2, . . . , 136-N. A NIC device 116-1, 116-2, . . . , 116-N that contains both an IN port 112-1, 112-2, . . . , 112-N and an OUT port 114-1, 114-2, . . . , 114-N can connect via Ethernet (e.g. daisy chain) 123-1, . . . , 123-N. For example, three NIC devices A, B, and C, can each include an IN port 112-1, 112-2, . . . , 112-N and an OUT port 114-1, 114-2, . . . , 114-N, device A can receive a signal through the IN port 112-1, 112-2, . . . , 112-N of device A and can transfer the signal through the OUT port 114-1, 114-2, . . . , 114-N of device A to the IN port 112-1, 112-2, . . . , 112-N of device B and device B can transfer the signal through the OUT port 114-1, 114-2, . . . , 114-N of device B to the IN port 112-1, 112-2, . . . , 112-N of device C.

At 604, the NIC device 116-1, 116-2, . . . , 116-N transfers the video images to a plurality of displays 136-1, 136-2, . . . , 136-N. The plurality of displays 136-1, 136-2, . . . , 136-N can be connected to the NIC device 116-1, 116-2, . . . , 116-N and can utilize a VoE receiver 120-1, 120-2, . . . , 120-N. A VoE receiver 120-1, 120-2, . . . , 120-N is a device capable of receiving a VoE signal. A VoE receiver 120-1, 120-2, . . . , 120-N can also transform the VoE signal into a different format. For example, if the display 136-1, 136-2, . . . , 136-N is a television, the VoE receiver 120-1, 120-2, . . . , 120-N could convert the format of the VoE to a format that can be displayed on a television (e.g. RGB, YPbPr, S-video).

At 606, a plurality of portions of the video images that correspond to the plurality of displays 136-1, 136-2, . . . , 136-N is determined utilizing a display scalar 122-1,

122-2, ..., 122-N. The display scalar 122-1, 122-2, ..., 122-N can be configured to receive and create portions of video images in various formats (e.g. Ethernet frame, RGB, YPbPr, S-video). The display scalar 122-1, 122-2, ..., 122-N can be configured according to the orientation of the plurality of displays 136-1, 136-2, ..., 136-N. For example, a set of four displays 136-1, 136-2, ..., 136-N can be placed in an orientation that creates a square. The set of four displays 136-1, 136-2, ..., 136-N from the example can then act as though they were a single display with the combined area of the set of four displays 136-1, 136-2, ..., 136-N. The display scalar 122-1, 122-2, ..., 122-N in this example would create four portions of the video images and each portion would correspond to each of the set of four displays 136-1, 136-2, ..., 136-N. Each display 136-1, 136-2, ..., 136-N could then display the corresponding portion of the video images creating the appearance of a single display with the combined area of the set of four displays 136-1, 136-2, ..., 136-N.

At 608, the display scalar 122-1, 122-2, ..., 122-N associates with each of the plurality of displays 136-1, 136-2, ..., 136-N of the display matrix to display the video clone of each of the portions of video images. As described herein, each of the plurality of displays can display 136-1, 136-2, ..., 136-N the corresponding portion of the video images creating the appearance of a single display with the combined area of the plurality of displays 136-1, 136-2, ..., 136-N.

In some embodiments the computing device 110, NIC devices 116-1, 116-2, ..., 116-N, and the displays 136-1, 136-2, ..., 136-3 are part of an intranet controlled by a single party.

The benefits of method 600 can include, but are not limited to, utilizing less expensive network cables compared to other video cables (Display Port (DP), VGA, Component Video), utilizing a display scalar configured to receive and create portions in a VoE configuration, and being able to utilize existing hardware and software.

Figure 7:
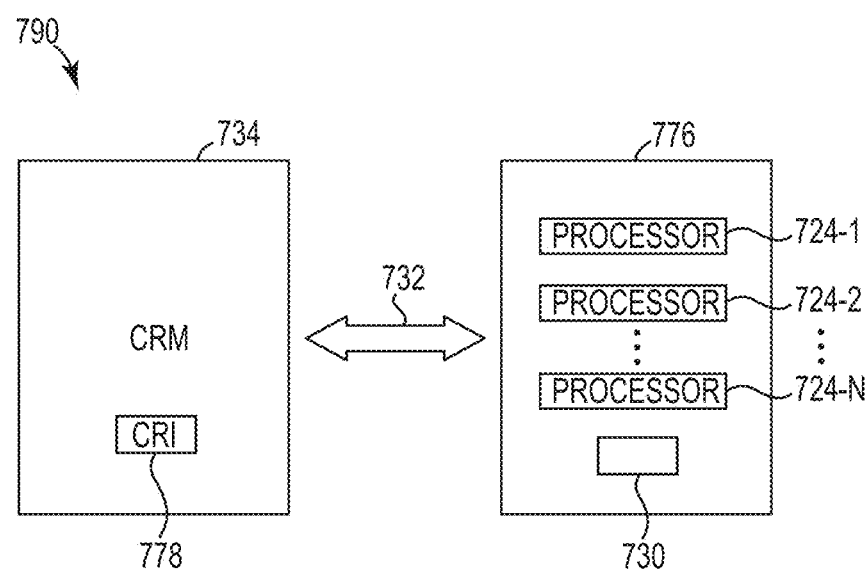
FIG. 7 illustrates a block diagram of an example of a computer-readable medium in communication with processing resources for providing a video clone to a display matrix, according to the present disclosure.

FIG. 7 illustrates a block diagram 790 of an example of a computer-readable medium (CRM) 734 in communication with processing resources 724-1, 724-2, ..., 724-N, for providing a video clone to a display matrix according to the present disclosure. CRM 734 can be in communication with a computing device 776 (e.g., Java application server, having processor resources of more or fewer than 724-1, 724-2, ..., 724-N). The computing device 776 can be in communication with, and/or receive a tangible non-transitory CRM 734 storing a set of computer-readable instructions 778 executable by one or more of the processor resources 724-1, 724-2, ..., 724-N, as described herein. The computing device 434 can include memory resources 730, and the processor resources 724-1, 724-2, ..., 724-N can be coupled to the memory resources 730.

Processor resources 724-1, 724-2, ..., 724-N can execute computer-readable instructions 778 that can be stored on an internal or external non-transitory CRM 734. A non-transitory CRM (e.g., CRM 734), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), flash memory, etc., as well as other types of computer-readable media.

The non-transitory CRM 734 can be integral, or communicatively coupled, to a computing device, in either in a wired or wireless manner. For example, the non-transitory CRM 734 can be an internal memory, a portable memory, a portable disk, or a memory associated with another computing resource (e.g., enabling the computer-readable instructions to be transferred and/or executed across a network such as the Internet).

The CRM 734 can be in communication with the processor resources 724-1, 724-2, ..., 724-N via a communication path 732. The communication path 732 can be local or remote to a machine (e.g., a computer) associated with the processor resources 724-1, 724-2, ..., 724-N. Examples of a local communication path 732 can include an electronic bus internal to a machine such as a computer where the CRM 734 is one of volatile, non-volatile, fixed, and/or removable storage medium in communication with the processor resources 724-1, 724-2, ..., 724-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 732 can be such that the CRM 734 is remote from the processor resources e.g., 724-1, 724-2, ..., 724-N such as in the example of a network connection between the CRM 734 and the processor resources e.g., 724-1, 724-2, ..., 724-N. That is, the communication path 732 can be a network connection. Examples of such a network connection can include a local area network (LAN), a wide area network (WAN), a personal area network (PAN), and the Internet, among others. In such examples, the CRM 734 can be associated with a first computing device and the processor resources 724-1, 724-2, ..., 724-N can be associated with a second computing device (e.g., a Java application server).

The processor resources 724-1, 724-2, ..., 724-N coupled to the memory 730 can divide received video images into portions utilizing a display scalar based on the display matrix. Furthermore, the processor resources 724-1, 724-2, ..., 724-N coupled to the memory 730 can transfer the video clone of each of the video image portions to a plurality of determined display locations of the display matrix via Ethernet, wherein each of the plurality of display locations includes a label assigned to the display location.

The specification examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method of displaying video on a display matrix of display devices, comprising:
    receiving, by a first network interface controller (NIC) device of a first of the display devices, a video image via Ethernet from a computing device;
    transferring the video image from the first NIC device to a second NIC device of a second of the display devices, wherein the first and second NIC devices are part of a chain of NIC devices in the respective display devices;

determining, with respective display scalars of the display devices, a plurality of portions of the video image that correspond to the display devices; and causing display of each of the portions of the video image on the display devices.

2. The method of claim 1, wherein the transferring of the video image comprises sending the video image from an Ethernet OUT port of the first NIC device to an Ethernet IN port of the second NIC device.

3. The method of claim 1, further comprising determining, by the display scalar of each of the display devices, a respective orientation of the plurality of the video image.

4. The method of claim 1, wherein the chain of NIC devices includes an Ethernet daisy chain of NIC devices.

5. A non-transitory computer-readable medium storing instructions executable by a system to cause the system to:
 receive, from a network interface controller (NIC) device of a first display device, a video image received by the NIC device via Ethernet, wherein the first display device is connected via a display port connection to a second display device, the first and second display devices being part of a matrix of display devices;
 convert, by the first display device, the received video image to a converted video image in a particular color space;
 determine, by a display scalar in the first display device, a first portion of the received video image that corresponds to the first display device;
 send, from the first display device, the converted video image via the display port connection to the second display device, to cause another portion of the received video image to be displayed using a display scalar of the second display device; and
 cause display of the first portion of the received video image by the first display device.

6. The non-transitory computer-readable medium of claim 5, wherein the second display device does not include a NIC device.

7. The non-transitory computer-readable medium of claim 6, wherein the converted video image includes an RGB video image.

8. The non-transitory computer-readable medium of claim 6, wherein the instructions are executable to cause the display scalar of the first display device to convert the received video image from a VoE video format to a different video format displayable by the first display device.

9. The non-transitory computer-readable medium of claim 8, wherein the instructions are executable to cause the display scalar of the first display device to determine a size of the first portion of the received video image.

10. The non-transitory computer-readable medium of claim 5, wherein the received video image is passed through a frame buffer to a video receiver in the first display device.

11. The non-transitory computer-readable medium of claim 5, wherein the display devices are connected in a display chain.

12. A display matrix, comprising:
 a plurality of display devices, wherein a first of the display devices comprises a first network interface controller (NIC) device to receive a video image via Ethernet from a computing device, and wherein a second of the display devices includes a second NIC device that has a packet analyzer to detect the video image sent to the first NIC device by the computing device,
 wherein the plurality of display devices include respective display scalars to divide the received video image into portions for display by the respective display devices.

13. The display matrix of claim 12, wherein the first NIC device is assigned an IP address to which the computing device sends the video image.

14. The display matrix of claim 12, wherein the first NIC device of the first display device is a master NIC device to which the computing system sends video images, and wherein a remainder of the display devices include NIC devices that have respective packet analyzers to detect the video images sent to the master NIC device.

\* \* \* \* \*

UNITED STATES PATENT AND TRADEMARK OFFICE
CERTIFICATE OF CORRECTION

PATENT NO. : 9,691,356 B2  
APPLICATION NO. : 14/354046  
DATED : June 27, 2017  
INVENTOR(S) : Kent E. Biggs et al.

It is certified that error appears in the above-identified patent and that said Letters Patent is hereby corrected as shown below:

On the Title Page

In item (74), Name of the Attorney, in Column 2, Line 2, delete "Heubsch" and insert -- Huebsch --, therefor.

In the Claims

In Column 9, Line 4, in Claim 1, delete "of each of the" and insert -- of the --, therefor.

In Column 9, Line 12, in Claim 3, delete "of the" and insert -- , of portions of the --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*